United States Patent [19]

Huinink et al.

[11] Patent Number: 4,794,970
[45] Date of Patent: Jan. 3, 1989

[54] VEHICLE WHEEL

[75] Inventors: Heinrich Huinink, Garbsen; Udo Frerichs, Langenhagen; Dionysius Poque, Aachen, all of Fed. Rep. of Germany

[73] Assignee: Continental Aktiengesellschaft, Hanover, Fed. Rep. of Germany

[21] Appl. No.: 904,791

[22] Filed: Sep. 4, 1986

Related U.S. Application Data

[63] Continuation of Ser. No. 665,305, Oct. 26, 1984, abandoned.

[30] Foreign Application Priority Data

Oct. 27, 1983 [DE] Fed. Rep. of Germany ....... 3338971

[51] Int. Cl.$^4$ ............................................. B60C 17/04
[52] U.S. Cl. ................................. 152/158; 152/379.5; 152/520
[58] Field of Search ............... 152/454, 539, 540, 544, 152/158, 379.3, 379.4, 520, 379.5, 381.4, 381.5, 381.6, DIG. 9, DIG. 17

[56] References Cited

U.S. PATENT DOCUMENTS

| | | | |
|---|---|---|---|
| 560,660 | 5/1896 | Tomlinson | 152/362 R |
| 2,844,180 | 7/1958 | Omeron | 152/330 RF |
| 2,933,118 | 4/1960 | Waber | 152/362 R |
| 3,212,548 | 10/1965 | Drazin | 152/158 |
| 3,392,772 | 7/1968 | Powers | 152/330 RF |
| 4,029,139 | 6/1977 | Abbott | 152/362 R |
| 4,076,066 | 2/1978 | Verdier | 152/362 R |
| 4,077,455 | 3/1978 | Curtiss, Jr. et al. | 152/362 R |
| 4,096,900 | 6/1978 | Olsen | 152/544 |
| 4,641,670 | 2/1987 | Poque et al. | 152/158 |

Primary Examiner—Michael W. Ball
Assistant Examiner—Ramon R. Hoch
Attorney, Agent, or Firm—Becker & Becker, Inc.

[57] ABSTRACT

A vehicle wheel on which can be mounted a pneumatic tire which essentially includes rubber or rubber-like synthetic material, and has a carcass with load-carrying cords which are anchored in the bead regions of the tire via inextensible core rings. The wheel has a rigid rim with laterally outwardly disposed rim flanges; disposed axially inwardly of these rim flanges on the radially outer side of the rim are seating surfaces for the tire. To minimize disrupting effects on the tire tread, while at the same time improving the emergency operating conditions, a support member is disposed axially inwardly of the seating surfaces on the rim. This support member has a diameter which is greater than the diameter formed by the rim flanges. In the region of a given rim flange, the tire wall extends laterally outwardly from a given core ring in a substantially flat manner, and in particular in an angular range of from 0° to 20° relative to the axis of rotation of the tire. The carcass neutral line passes through the same region of a given rim flange in such a way as to avoid a turning point. The core rings are eccentrically disposed in their head regions in such a way that when the tire is mounted, the inner diameter of the tire in these bead regions is less than it is during mounting of the tire.

13 Claims, 2 Drawing Sheets

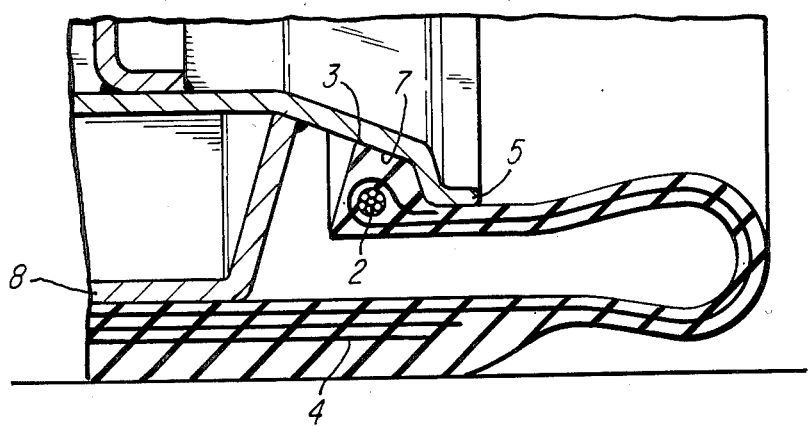
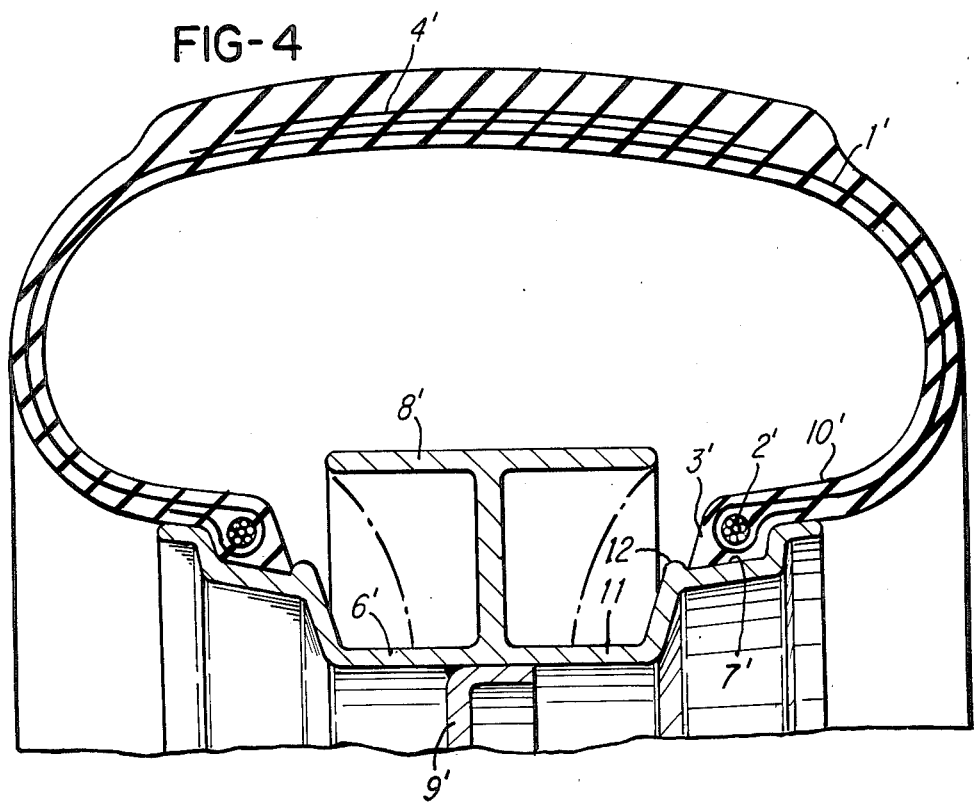

VEHICLE WHEEL

This application is a continuation of co-pending application Ser. No. 665,305-Huinink et al filed Oct. 26, 1984, now abandoned, and belonging to the assignee of the present invention.

BACKGROUND OF THE INVENTION

1. Field of the Invention

The present invention relates to a vehicle wheel on which a pneumatic tire can be mounted; the wheel has a rim which is provided laterally outwardly with rim flanges, adjacent to which, on the radially outer side of the rim, there are seating surfaces for the tire, which is a pneumatic tire comprised essentially of rubber or rubber-like synthetic materials and having a carcass with textile and/or metallic load-carrying cords; the carcass is anchored in the beads via inextensible core rings.

2. Description of Prior Art

A vehicle wheel of this general type is widely used at the present time. In order to improve this wheel system, numerous structural and material variations have been proposed in order to take into consideration the technical requirements of the market place. These requirements can be divided into several groups, namely "concept" (small weight of the system, large installation space for brakes accompanied by little space requirement of the wheel), "design characteristics during normal operation", i.e. at operational air pressure (driving comfort, driving stability, driving safety, durability, economy), "design characteristics in the pressureless state" (sufficient emergency operating capability without damage to the tire).

The improvements proposed to date frequently concern either the driving comfort while retaining the remaining driving characteristics, but not providing an emergency operating capability, or an ability to drive in the pressureless state, but with critical drawbacks during normal operation such as with regard to weight and resistance to rolling.

An object of the present invention, while at the same time achieving a reliable emergency operation capability, is to achieve a considerable minimization of the disturbance variables which the tire beads exert via the side wall on the tread.

Summary of the Invention

The vehicle wheel of the present invention may be characterized in that axially inwardly from the seating surfaces, the rim is provided with a support member which has a diameter which is greater than the diameter formed by the rim flanges; the tire wall extends laterally outwardly in a substantially flat manner from the core ring in the region of the rim flange, and in particular extends in an angular range of from 0° to 20° relative to the axis of rotation of the tire; the carcass neutral line passes through this region while avoiding a turning point, and the core ring is eccentrically disposed in a pivotable bead in such a way that when the tire is mounted, the inner diameter of the tire in the bead region is less than it is while the tire is being mounted.

The vehicle wheel of the present invention may also be characterized in that axially inwardly from the seating surfaces, the rim is provided with a recessed mounting portion for each tire bead, and furthermore with at least one support member which has a diameter which is greater than the diameter formed by the rim flanges; in the region of the rim flange, the tire wall extends laterally outwardly in a substantially flat manner from the core ring, and in particular in an angular range of from 0° to 20° relative to the axis of rotation of the tire; the carcass neutral line passes through this region while avoiding a turning point.

Pursuant to further specific features of the present invention, the greatest diameter of the rim flanges may be the same or greater than the center-to-center diameter of the core rings. The carcass neutral line may conform to the function of a catenary curve in that region which is disposed directly laterally outwardly adjacent to the core ring. When the tire is inflated but not under load, the tire wall may rise laterally outwardly in the region of the rim flange at an angle in a range of 0° to 5° relative to the axis of rotation of the wheel. In the region of the rim flange, the carcass may extend nearly horizontally, may be anchored in the bead by being looped around the core ring, and the looped-around carcass end may be disposed on the radially inner side. The diameter of the support member may be greater than the diameter formed by the rim flanges and the wall thickness of the tire wall.

Pursuant to the present invention, the tire side wall is pivotably suspended as a membrane on the rim flange, thus eliminating the need for a rigid and immobile bead zone which in itself has a great weight. This considerably reduces the supporting portion of the carcass, resulting in the advantage of a considerable increase in the traveling comfort at a given tire pressure.

Due to the reduction of the support portion of the carcass, thus stress results in the bead zone. This is very advantageous, especially for truck tires. While the fixed portion of the tire remains completely undisturbed, the forces which arise are absorbed by an increase of the angular region where the tire side wall leaves the rim.

Furthermore, the pivotable, and hence very flexible, connection of the tire side walls brings about a favorable ground support surface which is essentially free of a reactive effect due to a rigidity of the tire side walls. This results in a homogeneous distribution of pressure in the supporting surface. This then results in a uniform distribution of the frictional connection values in the entire region of the supporting surface, and hence in an increase of the frictional connection. In addition, the homogeneous distribution of pressure results in less wear and a more uniform wear pattern.

Finally, the inventive vehicle wheel results in less resistance to rolling, since in the bead region with the relatively small amount of material, such a great deformability, and hence such a great formation of heat, no longer occurs.

During an emergency operation, i.e. when driving in a pressureless condition, the tire rests upon the support member and bulges or curves laterally in such a manner that, in contrast to heretofore known vehicle wheels, contact with the roadway can be reliably avoided. In addition, contact zones having high friction are avoided in the inner side wall regions; with conventional vehicle wheels, such contact zones lead to rapid destruction of the tire. In addition to the rim construction, the design of the tire assures an outstanding emergency operation. As a result of the small support portion of the carcass, due to the flexible side walls up to the rim flange, the reactive operation in this region of the tire is nearly eliminated, hence avoiding destruction of the tire. Initial tests were made with the tire covering stretches of up to 100 km at a speed of about 80 km/h, without any damage resulting to the tire. Since furthermore no critical impairment of the driving conditions were encountered during emergency operation, the best conditions for eliminating the previously customary spare tire were provided.

Due to the eccentric arrangement of the core ring in the tire bead, and the pivotability of the tire bead during mounting, the previously customary well base can be completely dispensed with, thus resulting in the advantage of a larger installation space for the brakes.

The tire can be mounted on a one-piece rim; to surmount the support member, the rim is first moved into the tire approximately at right angles thereto, and the rim is then turned within the tire.

In contrast to wheel systems according to which the tire is mounted radially inwardly on the rim, there is achieved with the present invention the advantage of a simple tire manufacture on conventional machines and in existing types of molds.

BRIEF DESCRIPTION OF THE DRAWINGS

This object, and other objects and advantages of the present invention, will appear more clearly from the following specification in conjunction with the accompanying drawings, in which:

FIG. 3 is a view that shows a radial partial section of the vehicle wheel of FIG. 1 showing an emergency operating position of the tire; and FIG. 4 is a view that shows a radial partial section of another embodiment of the inventive vehicle wheel having a rim with supporting surfaces and two recessed mounting portions disposed laterally therefrom.

DESCRIPTION OF PREFERRED EMBODIMENTS

Figure 1:
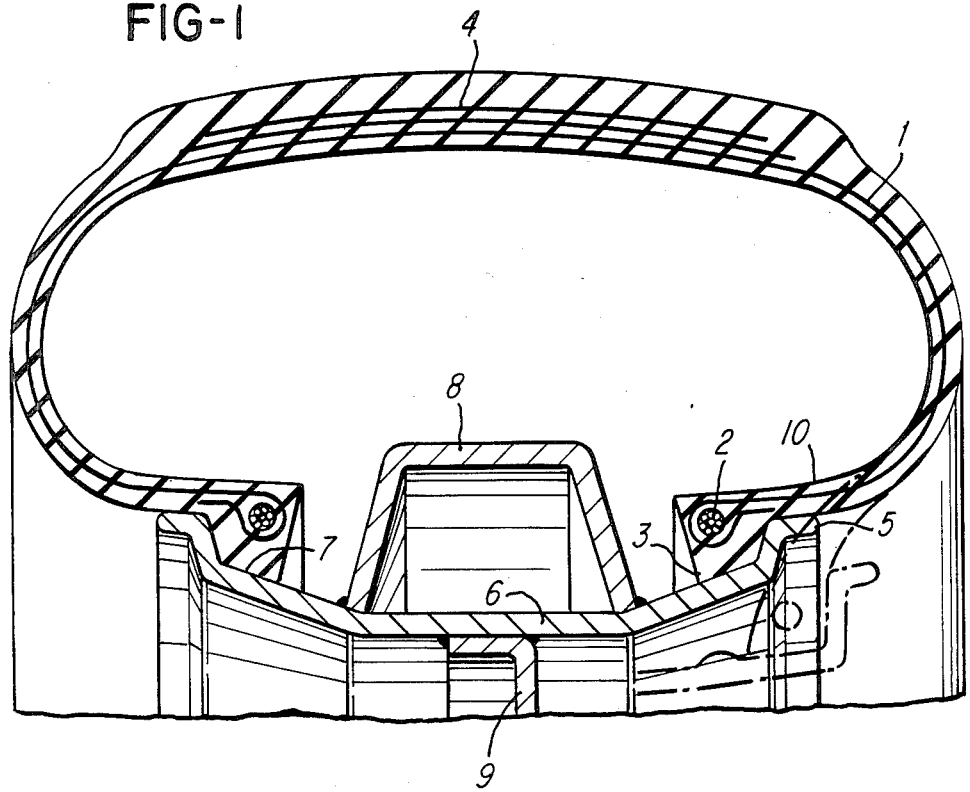
FIG. 1 is a view that shows a radial partial section of one embodiment of the inventive vehicle wheel with a one-piece rim having a support member, and with a tire having core rings which are eccentrically disposed in the beads.

Referring now to the drawings in detail, FIG. 1 illustrates a vehicle wheel on which a tire is mounted. The tire is a pneumatic vehicle tire which essentially comprises rubber or rubber-like synthetic materials. The illustrated belted tire has a radial carcass 1, the ends of which are anchored in the bead regions 3 by being looped around pull-resistant or inextensible core rings 2. A customary belt 4 is disposed between the tread and the carcass 1. Disposed laterally outwardly on the rigid, one-piece wheel rim are rim flanges 5; disposed next to these rim flanges on the radially outer side of the rim ring 6 are seating surfaces 7 for the tire. Disposed in the central region, also on the radially outer side of the rim ring 6, is a support member 8 which has a supporting surface for the tire; the diameter of the supporting surface is greater than the greatest diameter of the rim flanges 5. The upward, i.e. radially outward, limitation of the diameter of the support member 8 results from the amount of space required to be able to mount the tire. The rim ring 6 is mounted in a customary manner on a rim well 9. If necessary, the rim well 9 also can be mounted directly on the support member 8.

From the bead 3, in which the core ring 2 is eccentrically disposed, the tire wall 10 extends laterally outwardly in an extremely flat, i.e. essentially horizontal, manner, so that this sidewall passes over the rim flanges 5 at an angle in a range of 0° to 20°, preferably about 5°, to the axis of rotation of the wheel, measured when the tire is inflated and not under a load. Already at the level of the rim flange 5, the tire wall 10 is essentially no thicker than it is in the remainder of the sidewall region.

The carcass 1 is anchored about the core ring 2 in such a way that the looped-around carcass end is disposed radially inwardly. The carcass is preferably disposed in such a way that the carcass neutral line in that region which is directly laterally outwardly adjacent the core ring 2 conforms to the function of a catenary curve, and then merges into a region which is prescribed by the diaphragm theory, so that at no location is there produced a cusp or turning point.

Figure 2:
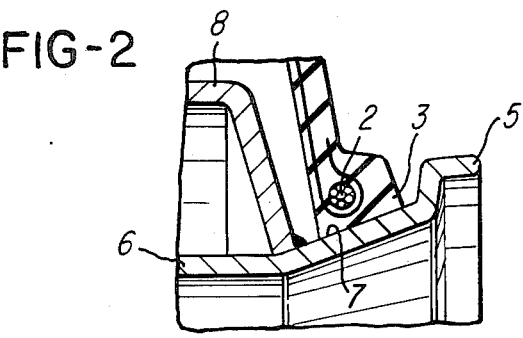
FIG. 2 shows a view that shows a portion of the vehicle wheel of FIG. 1, with one tire bead turned for mounting of the tire.

The eccentric arrangement of the core ring 2 in the bead region 3 for dispensing with the need for a recessed mounting portion is undertaken in such a way that, when the bead 3 is pivoted for mounting the tire (FIG. 2), the inner diameter of the tire is increased in the region of the bead 3 to such an extent that after a portion of the periphery of the bead has been placed on the rim seating surface 7, the remainder of the periphery can be pushed over the rim flange 5. For this purpose, the distance of the core ring 2 from that edge of the bead which faces the rim seating surface 7 in the mounted state of the tire (FIG. 1) must be sufficiently greater than in the mounting position (FIG. 2), since twice the difference of these distances will constitute the increase in diameter. As a further limiting condition, to provide sufficient protection against the beads being thrown off, at least half of the cross-sectional area of the core ring should be disposed radially inwardly of the level of the rim flange 5; in other words, the greatest diameter formed by the rim flanges 5 should be the same as or greater than the center-to-center diameter of the core rings 2, i.e. the diameter from one cross-sectional center to another. Details for an eccentric arrangement of the core rings 2 for eliminating a recessed mounting portion are described in U.S. Ser. No. 554,992, filed Nov. 25, 1983, now U.S. Pat. No. 4,597,426-Mark et al dated July 1, 1986 and belonging to the assignee of the present invention.

FIG. 3 shows the tire of FIG. 1 in an emergency position, in which an inner wall of the tire can be supported on the rim support member 8. It is expedient to provide the inner wall of the tire, or the support member 8, with a known lubricant coating. Due to the extremely flat orientation of the tire wall 10 in the region of the rim flange 5, the side wall can bulge or curve out to the side without contacting the roadway or inner parts of the side wall.

The second inventive embodiment, which is illustrated in FIG. 4, differs primarily from the vehicle wheel of FIG. 1 in that in addition to the T-shaped support member 8' (if necessary, this member can also have the shape indicated by the dot-dash lines), two small recessed mounting portions 11 are provided. This makes it possible to construct the tire beads 3' in a conventional manner with approximately centrally disposed core rings 2', thus simplifying manufacture of the tire. To better hold the tire bead 3', a conventional hump 12 can be provided. In other respects, the construction of the tire and rim is the same as was the case for the embodiment of FIG. 1.

The present invention is not limited to a vehicle wheel having the described belted tire with a radial carcass; rather, other types of construction can also be provided, such as one having a bias ply carcass. Not only can the present invention be used for wheels for passenger vehicles, but can also be used for other wheels, especially for trucks.

The present invention is, of course, in no way restricted to the specific disclosure of the specification and drawings, but also encompasses any modifications within the scope of the appended claims.

What we claim is:

1. A vehicle wheel on which can be mounted a pneumatic tire including an axis of rotation and bead regions as well as being made essentially of rubber or rubber-like synthetic material and having a carcass with load-carrying cords which are anchored in the bead regions of said tire by means of inextensible core rings; said wheel having a rigid rim with laterally outwardly disposed rim flanges extending axially away from each other; and in a location disposed axially inwardly of said rim flanges on the radially outer side of said rim including respective seating surfaces for said bead regions of said tire;

the improvement in combination therewith which comprises a support member that is disposed axially inwardly of said seating surfaces on the radially outer side of said rim; said support member having a diameter which is greater than the diameter formed by said rim flanges and which is sufficient for emergency operating capability without damage to the tire supported thereby with homogenous uniform pressure distribution along a substantially flat tire support surface for emergency operation capability; said tire having respective side walls, adjoining said bead regions, with each of said tire side walls, in the region of a given rim flange, extending laterally outwardly from a given core ring in a substantially flat manner when said tire is inflated and not under load, and in particular extending in an angular range of from 0° to 20° relative to said axis of rotation of said tire so that said tire side walls adjoining said bead regions are substantially flat against said rim flanges and extending axially away from each other and located radially inwardly relative to said support member diameter for emergency operating capability; said carcass having a neutral line which passes through the same region of a given rim flange in such a way as to avoid a turning point; said bead regions being pivotable, with said core rings having a predetermined diameter and being eccentrically disposed in bead regions thereof in such a way that when said tire is considered as tot he seating surface of said rim flange during installation, the bead region has an innermost diameter that lessens as a result of movement thereof during a change from a mounting position into an operating position of said tire relative to the seating surface of said rim flange although said core rings remain at the predetermined diameter, said tire side walls extending substantially flat outwardly from said bead regions and also extend substantially flat axially beyond said rim flanges in a parallel relationship spaced radially inwardly although extending spaced substantially horizontally axially of the tire support member during emergency operating capability.

2. A vehicle wheel in combination according to claim 1, in which the greatest diameter of said rim flanges is at least as great as the center-to-center diameter of said core rings.

3. A vehicle wheel in combination according to claim 1, in which said carcass neutral line, adjacent to a given core ring and directly laterally outwardly thereof, conforms to the function of a catenary curve.

4. A vehicle wheel in combination according to claim 1, in which said tire wall, when said tire is inflated and not under load, rises, in the region of a given rim flange, laterally outwardly at an angle in a range of from 0° to 5° relative to the axis of rotation of said tire.

5. A vehicle wheel in combination according to claim 1, in which said carcass extends nearly horizontally in the vicinity of said rim flanges, and in anchored in said bead regions by being looped around said core rings in such a way that the looped-around ends of said carcass are disposed on the radially inner side of the latter.

6. A vehicle wheel according to claim 1, in which the diameter of said support member is greater than the diameter formed by said rim flanges plus the thickness of said tire side wall at that location so that entire thickness of the tire side wall is radially inward relative to the support member diameter.

7. A vehicle wheel on which can be mounted a pneumatic tire including an axis of rotation and bead regions as well as being made essentially of rubber or rubber-like synthetic material and having a carcass with load-carrying cords which are anchored in the bead regions of said tire by means of inextensible core rings; said wheel having a rigid rim with laterally outwardly disposed rim flanges extending axially away from each other; and in a location disposed axially inwardly of said rim flanges on the radially outer side of said rim including respective seating surfaces for said bead regions of said tire;

the improvement in combination therewith which comprises a radially inwardly recessed mounting portion that is disposed axially inwardly of said seating surfaces for each of said bead regions; at least one tire support member having sidewalls provided on the radially outer side of the rim in said recessed mounting portion; said support member having a diameter which is greater than the diameter formed by said rim flanges and which is sufficient for emergency operating capability without damage to the tire supported thereby with homogeneous uniform pressure distribution along a tire support surface for emergency operating capability; said tire having respective walls adjoining said bead regions, with each of said tire walls, in the region of a given rim flange, extending laterally outwardly from a given core ring in a substantially flat manner when said tire is inflated and not under load, and in particular extending in an angular range of from 0° to 20° relative to said axis of rotation of said tire so that said tire walls adjoining said bead regions are substantially flat against rim flanges and extending axially away from each other and located radially inwardly relative to said support member diameter for emergency operating capability; said carcass having a neutral line which passes through the same region of a given rim flange in such a way as to avoid a turning point, said tire walls extending substantially flat outwardly from said bead regions which are spaced laterally outwardly away from any contact with respect to the sidewalls of said tire support member, and said tire walls also extend substantially flat axially beyond said rim flanges in a parallel relationship spaced radially inwardly although extending substantially horizontally axially of the tire support surface during emergency operating capability.

8. A vehicle wheel in combination according to claim 7, in which the greatest diameter of said rim flanges is at least as great as the center-to-center diameter of said core rings.

9. A vehicle wheel in combination according to claim 8, in which said carcass neutral line, adjacent to a given core ring and directly laterally outwardly thereof, conforms to the function of a catenary curve.

10. A vehicle wheel in combination according to claim 9, in which each tire wall, when said tire is inflated and not under load, rises, in the region of a given rim flange, laterally outwardly at an angle in a range of from 0° to 5° relative to the axis of rotation of said tire.

11. A vehicle wheel in combination according to claim 10, in which said carcass extends nearly horizontally in the vicinity of said rim flanges, and is anchored in said bead regions by being looped around said core rings in such a way that the looped-around ends of said carcass are disposed on the radially inner side of the latter.

12. A vehicle wheel in combination according to claim 11, in which the diameter of said support member is greater than the diameter formed by said rim flanges plus the thickness of said tire wall at that location.

13. A vehicle wheel on which can be mounted a pneumatic tire including tire beads and tire side walls and a tread as well as an axis of rotation and bead regions as well as being made essentially of rubber or rubber-like synthetic material and having a carcass with load-carrying cords which are anchored in the bead regions of said tire by means of inextensible core rings basically in a manner to attain a considerable and important reduction of disturbance magnitudes which the tire bead exerts via the tire side walls onto the tread while simultaneously attaining a reliable and dependable emergency-running capability; said wheel having a rigid rim with laterally outwardly disposed rim flanges extending axially away from each other; and in a location disposed axially inwardly of said rim flanges on the radially outer side of said rim including respective seating surfaces for said bead regions of said tire;

the improvement in combination therewith which comprises a support member that is disposed axially inwardly of said seating surfaces on the radially outer side of said rim; said support member having a diameter which is greater than the diameter formed by said rim flanges and which is sufficient for emergency operating capability without damage to the tire supported thereby with homogenous uniform pressure distribution along a tire support surface for emergency operating capability; said tire having respective side walls adjoining said bead regions, with each of said tire side walls, in the region of a given rim flange, extending laterally outwardly from a given core ring in a substantially flat manner when said tire is inflated and not under load, and in particular extending in an angular range of from 0° to 20° relative to said axis of rotation of said tire so that said tire side walls adjoining said bead regions are substantially flat against said rim flanges and extending axially away from each other and located radially inwardly relative to said support member diameter for emergency operating capability; said carcass having a neutral line which passes through the same region of a given rim flange in such a way as to avoid a turning point; and a pivotable connection of said tire side wall relative to bead regions respectively wherein said bead regions are pivotable, with said core rings having a predetermined diameter and being eccentrically disposed in bead regions thereof in such a way that when said tire is considered as to the seating surface of said rim flange during installation, the bead region has an innermost diameter that lessens as a result of movement thereof during a change from a mounting position into an operating position of said tire relative to the seating surface of said rim flange although said core rings remain at the predetermined diameter, said tire side walls extending substantially flat outwardly from said bead regions and also extend substantially flat axially beyond said rim flanges in a parallel relationship spaced radially inwardly although extending spaced substantially horizontally axially of the tire support member during emergency operating capability, said pivotable connection being attained via almost horizontal course of said tire side wall in a region of said wheel flanges particularly in axially outer vicinity and axially inner vicinity of said wheel flanges.

* * * * *